United States Patent [19]

Neiferd et al.

[11] Patent Number: 6,082,191

[45] Date of Patent: *Jul. 4, 2000

[54] INLET CONVEYOR FOR TIRE TESTING SYSTEMS

[75] Inventors: Keith A. Neiferd, Norton; Francis J. Bormet, Tallmadge; Richard Cukelj, Strongsville; Richard L. Krieger, Kent; David W. Lees, Sr., Ravenna; Dennis Allyn Reynolds, Munroe Falls; Christy Quinn, Doylestown, all of Ohio

[73] Assignee: Illinois Tool Works, Inc., Glenview, Ill.

[ * ] Notice: This patent is subject to a terminal disclaimer.

[21] Appl. No.: 08/988,478

[22] Filed: Dec. 10, 1997

Related U.S. Application Data

[60] Provisional application No. 60/036,718, Jan. 24, 1997.

[51] Int. Cl.$^7$ .................................................. G01M 17/02
[52] U.S. Cl. ............................................................ 73/146
[58] Field of Search ................................................. 73/146

[56] References Cited

U.S. PATENT DOCUMENTS 2,771,176  11/1956  Clark et al. .
2,781,119   2/1957  Talbot et al. .

(List continued on next page.)

FOREIGN PATENT DOCUMENTS 2104010   3/1983  United Kingdom .

OTHER PUBLICATIONS

Akron Standard product brochure for a prior testing machine known as Model 70 TUO, Dec., 1973.
Exhibit 1—photograph of a prior tire testing machine known as M–82.
Exhibit 2—photograph of a prior tire testing machine known as FD90.
Exhibits 3–4, photographs of a prior tire testing machine known as D90.
Exhibit 5—photograph of a prior tire testing machine known as D92.
Exhibits 6–7, photographs of a prior tire uniformity machine, Model 2D80.
Exhibit 8—photograph of a prior tire testing machine.
Exhibits 9–24—photographs of a prior tire testing machine known as D70.
Eagle Picher, Akron Standard Division, product brochure submitted in its entirety, entitled "Are you really saving when you buy used Tire Uniformity Machines? Or . . . ", date unknown.
2 page product brochure of a prior tire testing machine entitled "Tire Uniformity Equipment", date unknown.

(List continued on next page.)

*Primary Examiner*—Joseph L. Felber
*Attorney, Agent, or Firm*—Watts, Hoffmann, Fisher & Heinke Co.

[57] ABSTRACT

An inlet conveyor for conveying tires through a tire uniformity testing system includes a tire centering mechanism and a pair of conveyor belts for delivering tires to a tire testing station. A fixed conveyor having rollers on which tires can easily slide is secured to a frame that supports the centering mechanism. The conveyor belts are reeved around respective pulleys and are supported by support rails fixed to and extending away from the centering mechanism in cantilever fashion. A conveyor elevator is raised or lowered with respect to the frame unit to raise or lower the support rails and conveyor belts to either engage or disengage a tire resting on the fixed conveyor. The support rails and conveyor belts are adjustable in a lateral direction to vary the width of the space between the belts to accommodate different size tires. The conveyor belts are advanced by a rotary pneumatic actuator that precisely controls the distance the belts move to position the tire with respect to the testing station. The inlet conveyor is mechanically isolated from the testing station so that disturbances affecting the inlet conveyor are not transmitted to the testing station. The inlet conveyor is movable with respect to the testing station to reverse the direction of tire flow through the testing machine.

31 Claims, 10 Drawing Sheets

U.S. PATENT DOCUMENTS

| | | |
|---|---|---|
| 2,901,085 | 8/1959 | McCoy . |
| 3,081,959 | 3/1963 | Goodwin . |
| 3,089,576 | 5/1963 | Sauer et al. . |
| 3,102,627 | 9/1963 | Acton et al. . |
| 3,221,364 | 12/1965 | Bailey et al. . |
| 3,244,575 | 4/1966 | Sabo et al. . |
| 3,346,434 | 10/1967 | Fulton . |
| 3,687,260 | 8/1972 | Willows . |
| 3,817,003 | 6/1974 | Monajjem . |
| 3,837,689 | 9/1974 | Csatlos . |
| 3,849,942 | 11/1974 | Monajjem . |
| 3,914,907 | 10/1975 | Hofelt, Jr. et al. . |
| 3,987,672 | 10/1976 | Loyer ........................................ 73/146 |
| 4,023,407 | 5/1977 | Vanderzee . |
| 4,024,372 | 5/1977 | Herrmann . |
| 4,191,055 | 3/1980 | Orem et al. . |
| 4,241,300 | 12/1980 | Hayes et al. . |
| 4,458,527 | 7/1984 | McFarland et al. . |
| 4,489,598 | 12/1984 | Beebe et al. . |
| 4,576,040 | 3/1986 | Cargould . |
| 4,638,756 | 1/1987 | Collmann . |
| 4,702,287 | 10/1987 | Higble et al. . |
| 4,704,900 | 11/1987 | Beebe . |
| 4,723,563 | 2/1988 | Kane . |
| 4,785,864 | 11/1988 | Cargould et al. . |
| 4,805,125 | 2/1989 | Beebe . |
| 4,815,004 | 3/1989 | Beebe . |
| 4,846,334 | 7/1989 | Cargould . |
| 4,852,398 | 8/1989 | Cargould et al. . |
| 4,870,858 | 10/1989 | Smith et al. . |
| 4,885,936 | 12/1989 | Hayes . |
| 4,896,531 | 1/1990 | Hayes . |
| 4,976,141 | 12/1990 | Cargould et al. . |
| 5,027,649 | 7/1991 | Himmler . |
| 5,029,467 | 7/1991 | Cargould . |
| 5,052,218 | 10/1991 | Iwama ........................................ 73/146 |
| 5,067,348 | 11/1991 | Himmler et al. . |
| 5,107,702 | 4/1992 | Iwama . |
| 5,378,273 | 1/1995 | Taguchi et al. . |
| 5,390,540 | 2/1995 | Mallison . |
| 5,481,907 | 1/1996 | Chasco et al. . |
| 5,566,816 | 10/1996 | Gross et al. . |
| 5,605,215 | 2/1997 | Gross et al. . |

OTHER PUBLICATIONS

Eagle Picher, Akron Standard Division, product brochure submitted in its entirety, entitled "The Standard of the World", date unknown.

Advertisement showing a prior tire testing machine known as 2D80.

A copy of an Akron Standard product brochure entitled "Setting The Standards for the World", submitted in its entirety, date unknown.

Akron Standard Sales Specification for Tire Uniformity Machine Model D90, Jan. 1990.

Akron Standard Sales Specification for Tire Uniformity Machines, Series D70, Apr. 1997.

One page advertisement showing a prior tire testing machine, Akron Special Machinery, Inc., date unknown.

One page advertisement showing a prior tire testing machine known as X75–13 TUO, Akron Special Machinery, Inc., date unknown.

Exhibits 25–28 from Kobe Steel, Ltd., drawing showing a prior tire testing machine known as PC–UXO–P2, date unknown.

Exhibitsn 29–39 from Hofmann Maschinenbau Gmbh, drawing showing prior tire testing machines, copyright 1994.

6,082,191

INLET CONVEYOR FOR TIRE TESTING SYSTEMS

This application claims priority to provisional application No. 60/036,718, filed Jan. 24, 1997.

TECHNICAL FIELD

The present invention relates generally to conveyors for transporting articles and, in particular, to an inlet conveyor for transporting tires through a tire uniformity testing system.

BACKGROUND ART

In the manufacture of tires, various irregularities and variations in the dimensions of the tires can arise. For example, dimensional irregularities can arise from inaccuracies in the molding process, changes in the characteristics of the materials and compounds employed in manufacturing the tires, inaccurate centering and variations in the vulcanization process, etc. All of the possible irregularities and variations in the tires, which can arise during manufacture either singularly or through interaction with one another, can cause eccentricity, static and dynamic unbalance in the tire, and force variation which can result in tire vibration or noise during use.

It is possible to correct many of these irregularities by first measuring the tire variations and applying various corrective actions to the tire. To measure the variations, the tire is placed in a tire uniformity inspection machine. In currently available tire uniformity inspection machines, testing is fully automatic. Tires are fed by conveyor to a testing station where each tire is mounted upon a chuck apparatus, inflated to a predetermined pressure and rotatably driven at a standard speed with its tread surface abutting the circumferential surface of a loadwheel. The loadwheel is instrumented with load cells that measure forces due to the tire acting on the loadwheel in directions of interest. The data gathered during the testing process may be used to take immediate corrective action via shoulder and tread grinders, which selectively grind rubber from regions of the tire to compensate for the variations detected during the testing process. Alternately, or additionally, the data taken during the testing process may be used to mark specific regions of the tire to alert the buyer/installer to an area of interest, such as an irregularity or point of high force in the tire, which will enable the installer to take corrective or compensating action during installation of the tire onto a wheel.

In the typical tire uniformity testing machine available today, a vertically-movable lower rim is supported in the base of the machine and is mounted for movement toward and away from a rim fixed to the top of the machine. An elaborate framework including a plurality of spaced apart columns supports the tire testing equipment as well as the sensing, grinding and marking equipment. Many of the current machines when fully outfitted with a full compliment of subassemblies are very difficult to service and require great effort to convert from one tire size to another. In at least some of the currently available machines, the various subcomponents, such as grinders, sensors and marking equipment, are not well integrated because they were added to the basic structure over the course of time. Cabling for both power and control signals between the various components and a basic control panel can be very complex and difficult to troubleshoot should problems arise.

In still other testing machines, the level at which tires are tested at the testing station is well above the plant floor so as to require maintenance workers and operators to use auxiliary equipment, such as ladders or other devices, to reach componentry needing adjustment or service.

Further, known testing machines are somewhat limited in flexibility in that they are not easily adapted for use in a variety of manufacturing environments. Once assembled, conventional testing machines typically do not permit changes in the direction tires are moved through the machine, at least not without substantial alteration or rearrangement of the machine components. One reason it is difficult to change the direction of tire flow through known machines is that the inlet conveyor typically is fixed to or forms part of the testing station; therefore, it is either impossible or impractical to alter the machine so as to permit the tires to be input at the opposite end of the machine. However, it may be necessary or desirable to provide users with the option of selecting different tire input directions due to, for example, different manufacturing plant layouts or the need to modify an existing plant layout.

Another problem that may arise due to the inlet conveyor being fixed to or part of the testing machine is that the loadwheel may produce erroneous or inaccurate uniformity measurements as a result of disturbances at the inlet conveyor. For example, physical disturbances at or near the inlet conveyor may be transmitted to the testing station so as to adversely affect test results, e.g., by impacting the readings generated by the load cells carried by the loadwheel, the result of such disturbances being inaccurate or inconsistent uniformity determinations. Accordingly, there is a need in the art for an improved inlet conveyor suitable for use in tire testing machines which provides increased flexibility and accurate, consistent force readings relative to existing inlet conveyors.

SUMMARY OF THE INVENTION

The invention provides an inlet conveyor for use in conveying tires through a tire uniformity testing system. The tire testing system includes a tire centering station and a tire testing station. The inlet conveyor includes at least one conveying member for transporting tires from the centering station to the testing station and means for moving the conveying member a precise distance which carries a tire from the centering station to the testing station.

In specific embodiments, the inlet conveyor includes a frame and a fixed conveyor or tire support member secured to the frame that preferably includes rollers that permit tires to move both longitudinally (i.e., in the direction of flow through the machine) and laterally. The fixed conveyor is located in the centering station and a centering mechanism engages the outer periphery of a tire to move the tire on the fixed conveyor. The tire is centered about a centering axis located a predetermined distance from the rotational axis of the testing station. The actuator moves the conveying member a distance corresponding to the predetermined distance to ensure the tire is delivered to a proper position at the testing station. A tire is delivered from a supply of tires to be tested to the centering station by a kick roller and then is centered by the centering mechanism.

In more specific embodiments, the conveyor includes a pair of spaced conveyor belts carried by a conveyor elevator for raising and lowering the conveyor belts with respect to the frame. The conveyor elevator is slidably engaged with the frame for vertical movement between raised and lowered positions. The conveyor belts are supported by first and second support rails that extend away from the centering station in cantilever fashion and run substantially the entire length of the belts, the belts being reeved around pulleys located adjacent opposite ends of the support rails. Upon actuation of suitable means for moving the elevator, such as a pneumatic cylinder, the support rails and conveyor belts are raised or lowered with respect to the frame so as to either engage or disengage a tire resting on the fixed conveyor. The means for moving the conveyor belts in a conveying direction preferably is a rotary pneumatic actuator that precisely controls the distance the belts move so as to properly position the tire with respect to the testing station and, if desired, a tire sorting/marking station and an exit conveyor assembly disposed downstream from the testing station. The conveyor belts preferably are movable to adjust the width of the space between the belts to accommodate different size tires.

A beneficial feature of a testing system including an inlet conveyor constructed according to the invention is that the structure comprising the centering station is self-supporting and mechanically isolated from the testing station; thus, disturbances affecting the centering station are not transmitted to the testing station. This feature also allows the inlet conveyor to be moved with respect to the testing station, thereby permitting reversal of the direction of tire flow through the testing machine, such reversal being accomplished by moving the exit subsystems (e.g., the tire sorting/marking station and exit conveyor) to the former inlet side of the machine, and moving the inlet conveyor to the former exit side of the machine. The conveyor itself also is preferably unattached and mechanically isolated from the testing station. Prior art testing machines did not provide such flexibility or easy reversal of the direction of tire flow through the machine.

Other features, benefits and advantages of the invention will be apparent from the following detailed description of preferred embodiments taken in conjunction with the accompanying drawing figures.

DETAILED DESCRIPTION OF PREFERRED EMBODIMENTS

Figure 1:
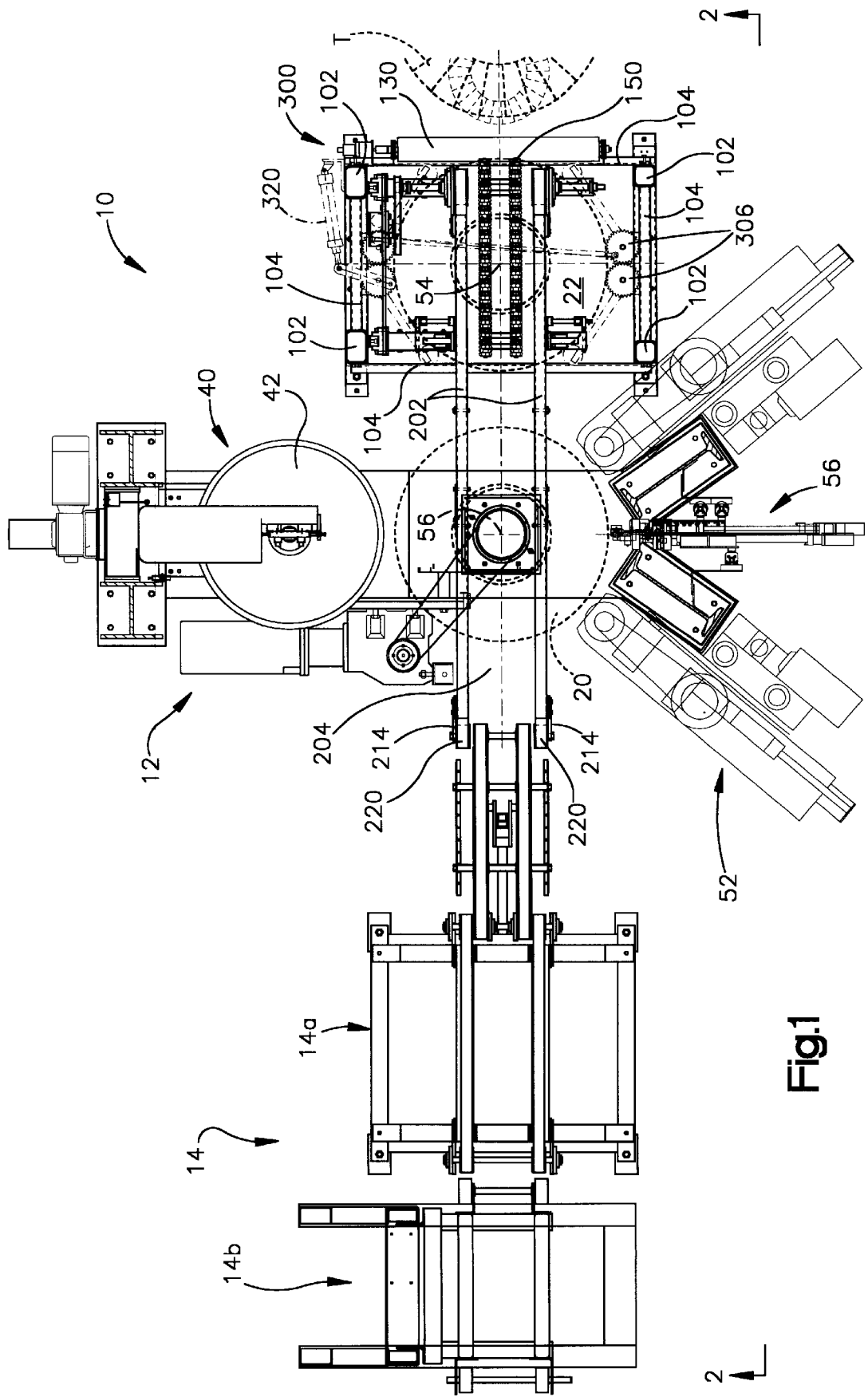
FIG. 1 is a plan view of a tire testing system including an inlet conveyor constructed according to a preferred embodiment of the present invention.

FIG. 1 illustrates, in plan view, the overall arrangement of a tire testing system which includes an inlet conveyor constructed according to a preferred embodiment of the invention. The overall tire testing system is more fully described in co-pending application Ser. No. 08/988,480, filed Dec. 10, 1997, and entitled TIRE UNIFORMITY TESTING SYSTEM, the subject matter of which is hereby incorporated by reference. Accordingly, the detailed description which follows relates primarily to the inlet conveyor; however, the overall tire testing system is discussed below briefly for sake of clarity and in order to set forth the environment in which the inventive conveyor is primarily intended for use. Of course, it will be recognized by those skilled in the art that features of the inlet conveyor may render same useful in applications other than conveying tires in connection with a tire testing machine. Thus, the invention should not be construed as necessarily being limited to any particular environment.

Referring to FIG. 1, the overall tire testing system comprises the following major subsystems: an inlet conveyor 10, a testing station 12, and an exit module 14 including an optional marking station 14a and tire sorting mechanism 14b. A tire positioned at the testing station 12 is tested and optionally ground to adjust the roundness, mechanical uniformity and/or any other physical properties of the tire. In FIG. 1, a tire indicated by reference character 20 (shown in phantom) has been delivered to the testing station by the inlet conveyor 10 so that the tire is clamped between lower and upper rims of an automatic adjustable width chuck apparatus (shown in phantom in FIG. 2). The rims are carried, respectively, by a spindle assembly 30 and a movable chuck assembly 32 comprising the chuck apparatus. The adjustable width chuck apparatus is more fully disclosed in co-pending application Ser. No. 08/988,119, filed Dec. 10, 1997, and entitled AUTOMATIC ADJUSTABLE WIDTH CHUCK APPARATUS FOR TIRE TESTING SYSTEMS, the subject matter of which is hereby incorporated by reference.

The tire 20 is clamped between the rims and inflated via the spindle assembly 30. After inflation, a loadwheel assembly 40 including a loadwheel 42 is moved into abutting relationship with the outer surface of the tire 20. As is conventional, the tire is rotated against the loadwheel which monitors the load exerted by the tire via load cells. As is known in the art, data taken from the load cells is used to determine the uniformity of the tire. If desired, adjustments to the uniformity of the tire are made by one or more grinders, indicated generally by reference character 52, for grinding the lower and upper (i.e., shoulder) and center tread portions of the tire. The loadwheel assembly is more fully disclosed in co-pending application Ser. No. 08/988,509, filed Dec. 10, 1997, and entitled LOADWHEEL ASSEMBLY FOR TIRE TESTING SYSTEMS, the subject matter of which is hereby incorporated by reference.

A probe system, indicated generally by the reference character 56, may form part of the testing station and includes upper and lower sidewall sensor assemblies, upper and lower shoulder sensors, and a center tread sensor (not shown). The probe system is more fully disclosed in the aforementioned co-pending application relating to the overall tire testing system.

Figure 2:
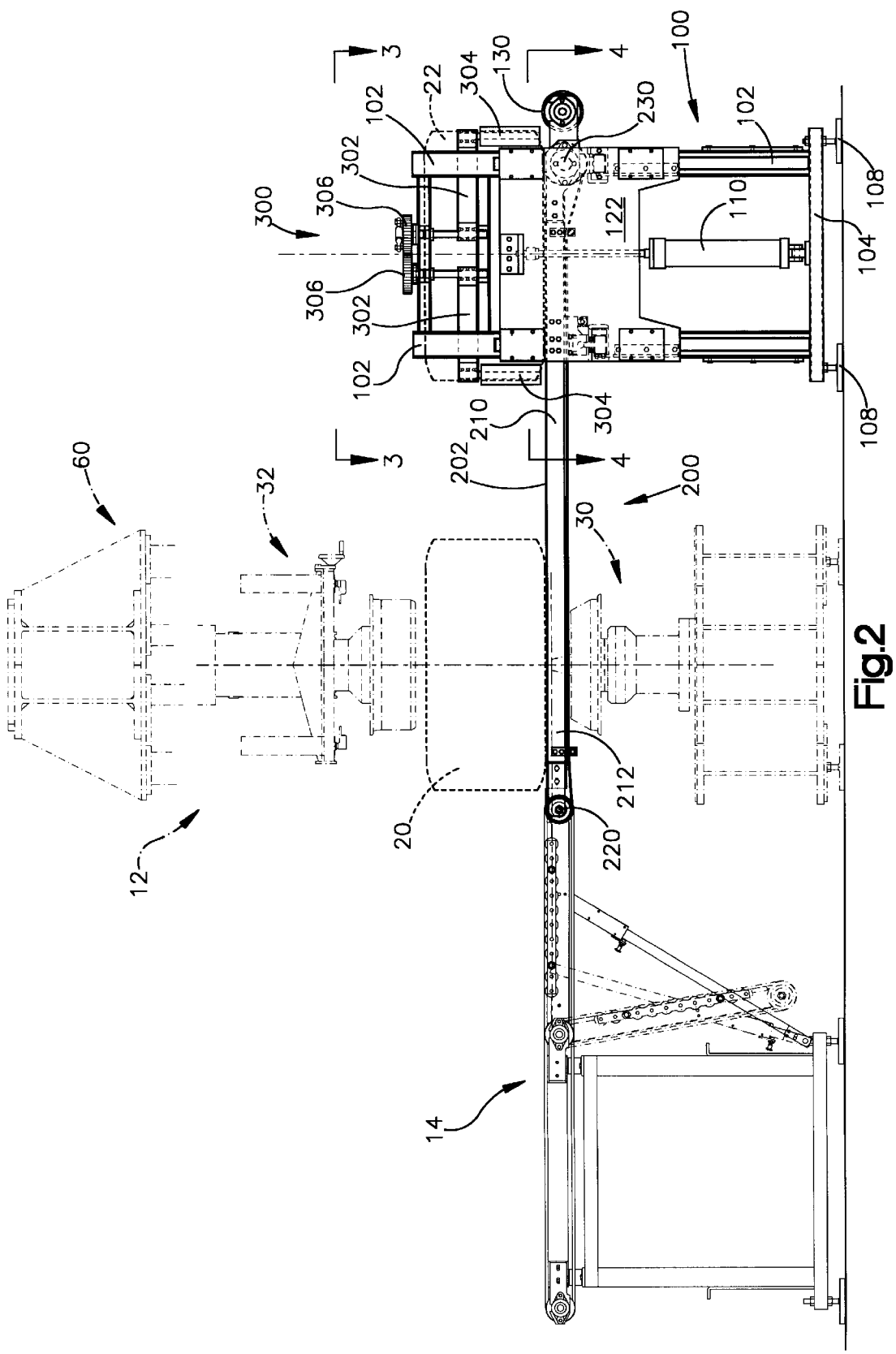
FIG. 2 is a front elevation view of the tire testing system of FIG. 1.
Figure 6:
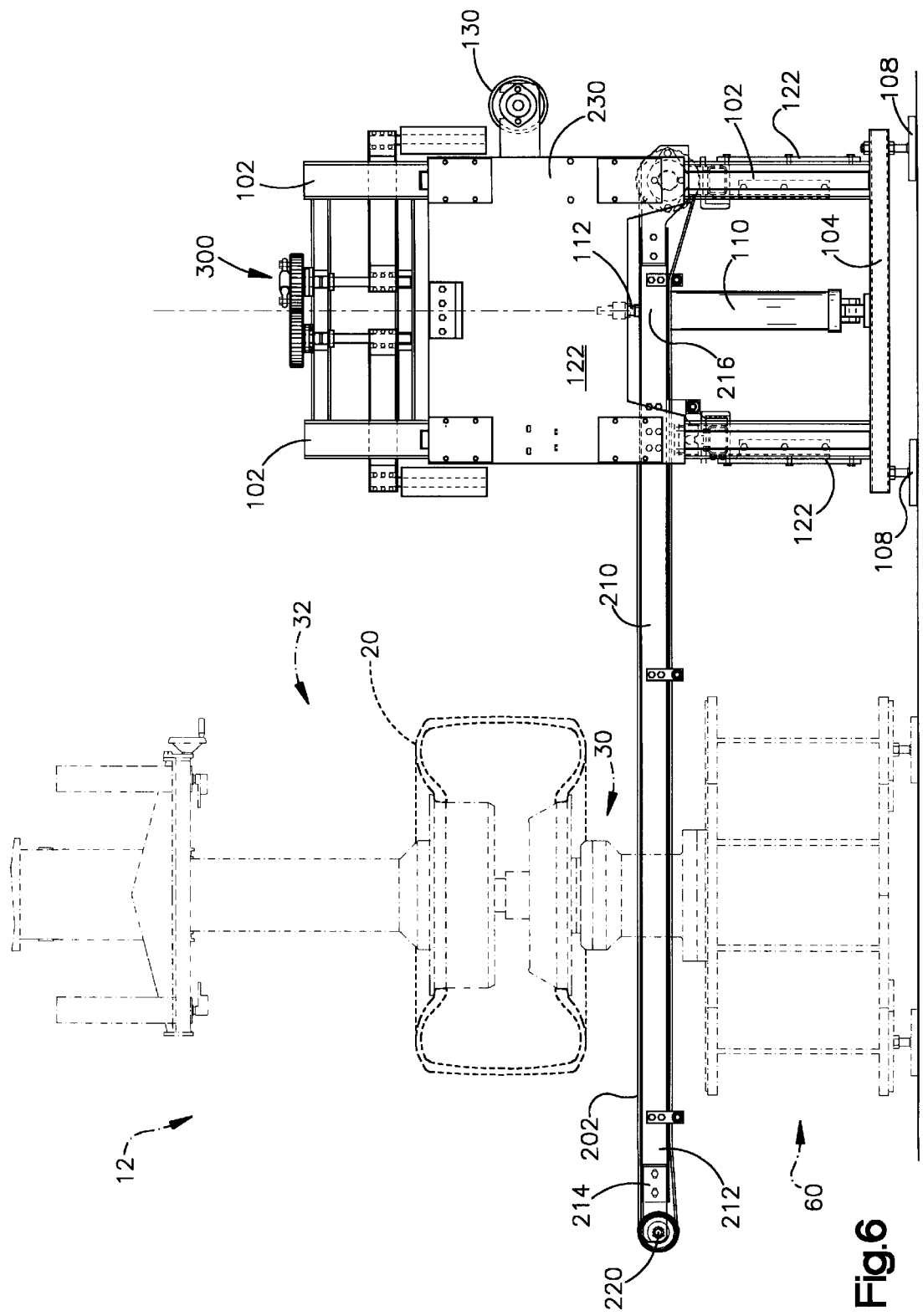
FIG. 6 is a front elevation view of the tire testing system of FIG. 1 showing the inlet conveyor.

The spindle assembly 30, chuck assembly 32, loadwheel assembly 40, grinders 52 and probe system 56 are mounted to a gantry-like frame system indicated generally by the reference character 60 in FIGS. 2 and 6. The frame 60 is constructed as described in the aforementioned co-pending application relating to the overall tire testing system.

As mentioned above, the inlet conveyor of the invention is described in connection with its preferred and illustrated application, namely, conveying tires to a tire uniformity testing station such as that indicated by reference character 12. Those skilled in the art will recognize that the inlet conveyor disclosed herein is suitable for use in conveying articles, preferably tires, to or from apparatus other than a uniformity testing machine, e.g., apparatus which measure other characteristics of a tire and/or perform a process relating to the manufacture or production of tires. Accordingly, it should be appreciated that the description herein of the conveyor 10 only relates to one possible application of the invention.

Referring to FIGS. 1 and 2, the inlet conveyor of the invention may be viewed as comprising three main components: a frame indicated generally by the reference character 100, a tire conveyor indicated generally by the reference character 200, and a tire centering mechanism located at a centering station and indicated generally by the reference character 300. The centering mechanism 300 centers a tire about an axis 54 that is located a predetermined distance from the rotational axis 56 of the testing station 12. The tire conveyor 200 and centering mechanism 300 are secured to the frame 100.

With reference to FIGS. 1, 2, 5 and 6, frame 100 comprises vertical posts 102 and horizontal beams 104 attached to and extending between posts 102. Support feet 108 support the frame on a floor or other surface and allow the frame 100 to be moved should it become necessary to relocate the inlet conveyor, for example, to change the flow of tires through the machine. In the preferred embodiment, the frame unit is of generally rectangular shape with four posts 102 disposed at the four corners and a plurality of horizontal beams 104 extending between upper and lower portions of the posts. Sidewall plates 122 may be provided between the posts 102 to add further rigidity to the frame. It will be recognized that the number and specific orientation of posts 102 and beams 104 may be varied from that shown in the drawings. The opposite sides of the frame 100 (i.e., above and below the frame as viewed in FIG. 1) are located on an operator side and an elevator side of the testing system. The operator side is designed to provide easier access to the machine components and, in FIG. 1, is located on the same side as grinders 52 and probe system 56.

Figure 5:
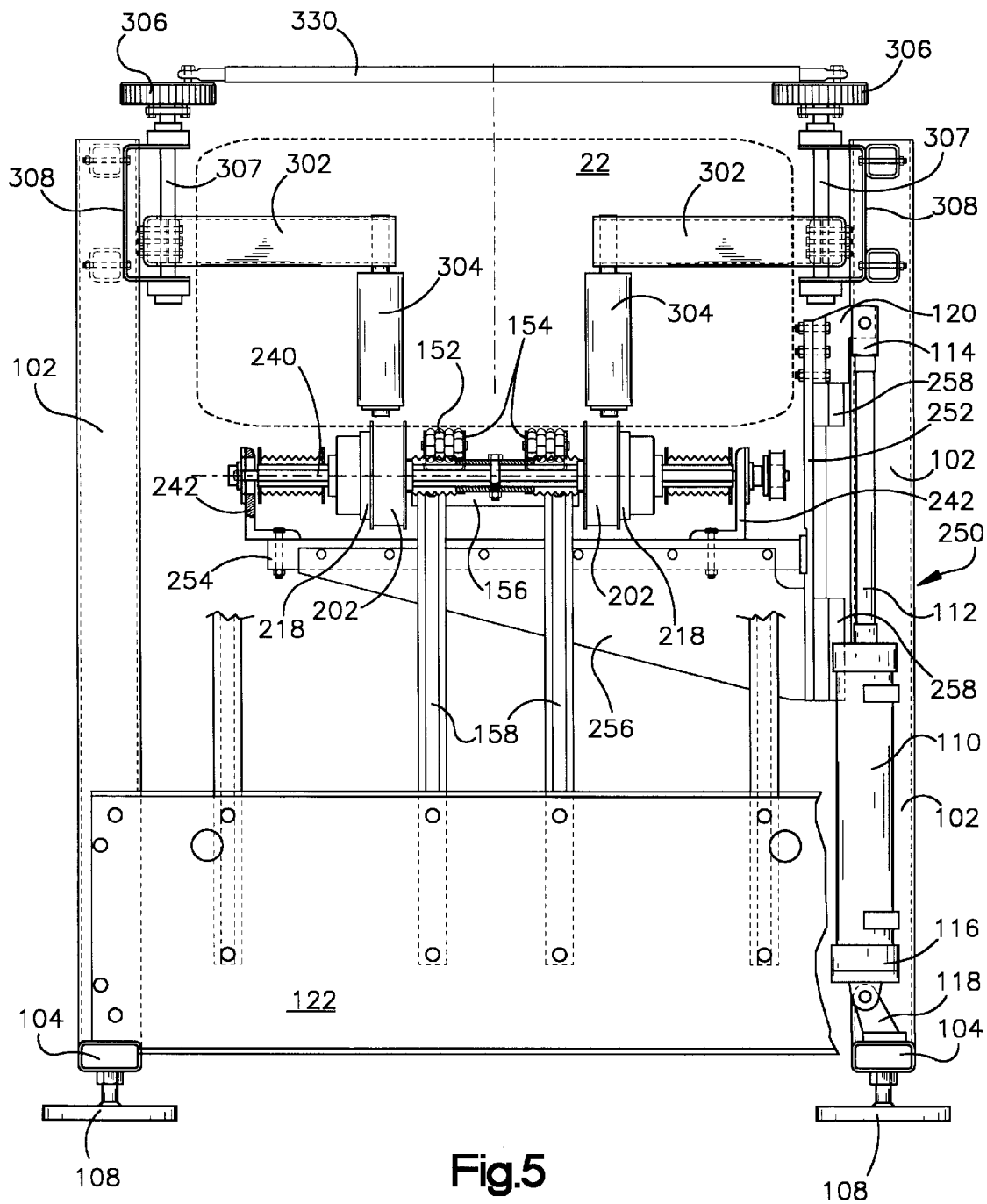
FIG. 5 is a fragmentary end elevation view of the tire testing system of FIG. 1 showing the centering mechanism and inlet conveyor.

The frame 100 is provided with means for moving the tire conveyor 200 in a vertical direction relative to the frame. In a preferred embodiment, the means for raising and lowering the conveyor comprises a pneumatic cylinder 110 including a rod 112 with a clevis 114 connected to a conveyor elevator 250 via a bracket 120, the butt end 116 of the cylinder being attached to a hinge bracket 118 fixed to frame 100 (FIG. 5). Upon actuation of cylinder 110, tire conveyor 200 is raised or lowered with respect to frame 100. While a pneumatic cylinder is preferred, other devices may be used to move the tire conveyor, e.g., a motor driven chain and sprocket assembly, a rotatable ball or lead screw assembly, etc.

A conveyor 150 is secured to frame 100 preferably at a fixed position to accept and support tires delivered from a kick roller 130. The kick roller 130 serves to separate a tire to be tested from a supply of tires located on a feed conveyor (not shown), the tire being kicked onto the conveyor 150 upon contacting the rotating roller 130. The conveyor 150 preferably is an "omni-roll" type conveyor comprising a plurality of rollers 152 that permit tires to move longitudinally (i.e., in the direction of flow through the machine) and laterally, this movement taking place during centering of the tire upon actuation of centering mechanism 300. Conveyor 150 includes two trays 154 that support two groups of rollers 152, the trays 154 being fixed to a support 156 which in turn is fixed to struts 158 mounted to frame plate 122 (FIG. 5). In the preferred embodiment the conveyor 150 thus is fixed in a desired vertical position relative to frame 100.

As seen best in FIGS. 1 and 6, tire conveyor 200 preferably comprises a pair of longitudinally extending conveyor belts 202 laterally spaced from each other to define a gap 204 therebetween. The belts 202 are supported by a pair of rails 210 extending substantially the entire length of the belts. The rails 210 have ends 216 secured to the conveyor elevator 250 adjacent the centering station (and frame 100) and opposite ends 212 extending away in a cantilever manner. While two belts 202 are preferred, it should be noted that more or less belts could be used. The preferred construction forms a space between the belts that allows the spindle assembly 30 of the testing station to pass therethrough upon lowering of the conveyor, the conveyor extending from the centering station to the testing station as shown.

The elevator 250 includes an elevator plate 252 (FIGS. 3 and 5) supporting a pair of elevator forks 254 each of which is strengthened by a gusset 256. A pair of guides 258 are fixed to elevator plate 250 and slidably engage complimentary guides 106 carried by (or formed integrally with) the frame posts 102 disposed on the elevator side of the machine. Actuation of cylinder 110 extends or retracts rod 112 to raise or lower elevator 250 with respect to frame 100, the cooperating guides 106, 258 facilitating smooth relative movement of the components. See FIG. 3.

Figure 3:
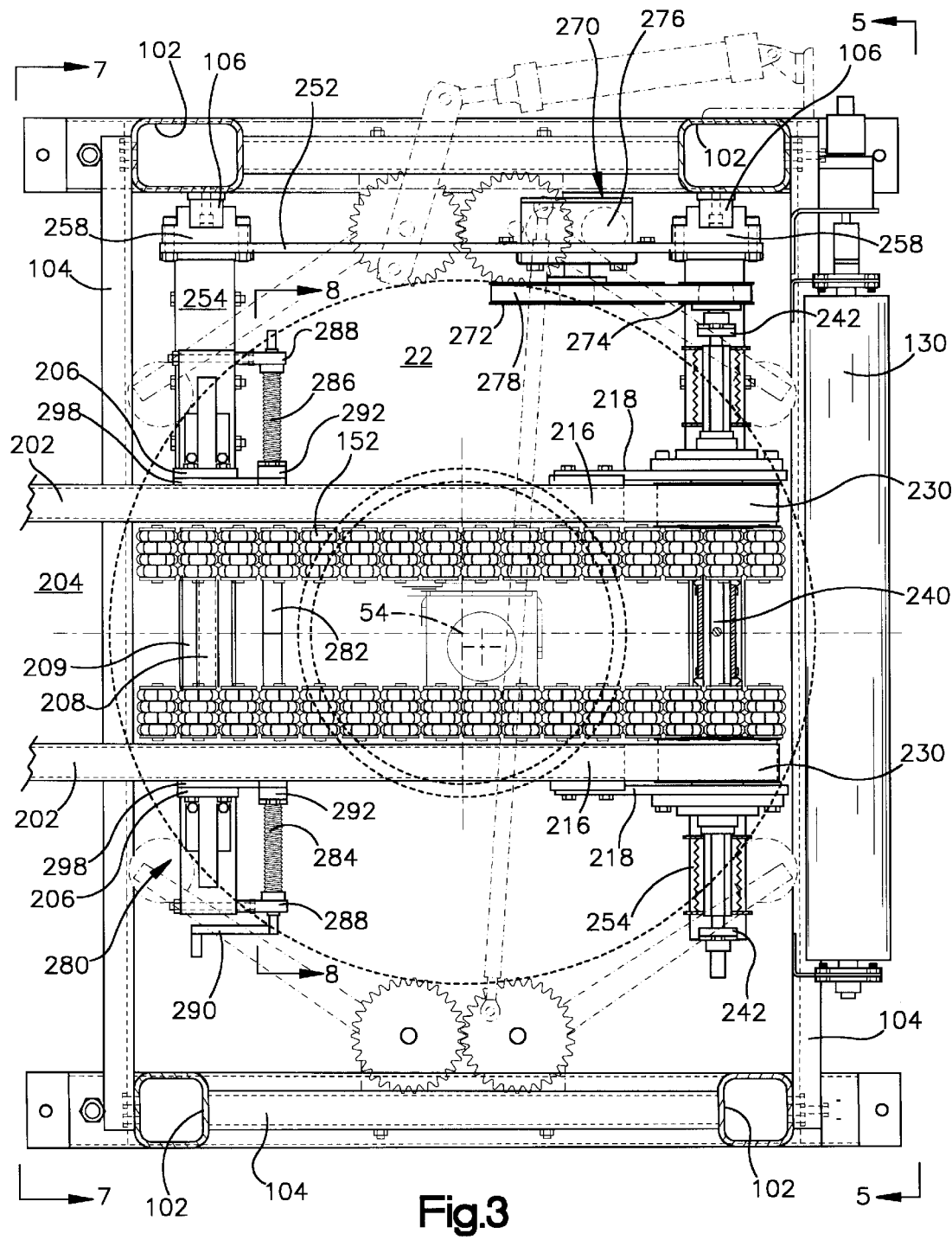
FIG. 3 is a plan view of a centering station forming part of the tire testing system of FIG. 1.

The conveyor support rails 210 are provided with pulleys around which the belts 202 are reeved. In particular, the cantilevered ends 212 of the rails 210 are attached to idler support brackets 214 which mount idler pulleys 220 (FIG. 6). The opposite ends 216 of rails 210 are attached to conveyor support brackets 218 which are secured to a drive shaft 240 (FIG. 3). A pair of drive pulleys 230 are also mounted to the drive shaft 240, for example a splined or keyed shaft, and transmit torque to the pulleys and belts passing therearound, the shaft 240 being rotatably supported by brackets 242 fixed to the elevator fork 254 disposed adjacent kick roller 130. The conveyor support brackets 218 are mounted to the drive shaft 240 by bearings that permit the rails 210 to be pivoted about the drive shaft. This feature allows the conveyor to be pivoted up and away from the testing station for maintenance, repair, etc.

The end of shaft 240 adjacent the elevator side of the machine carries a timing pulley 274 that is rotated by a timing belt 278. The timing belt 278 is driven by a timing pulley 272 connected to the output of suitable drive means 276 carried by the elevator 250. The pulleys 272, 274, timing belt 278, and drive means 276 comprise a conveyor drive mechanism indicated by reference character 270 in FIG. 3.

In the preferred embodiment, drive means 276 is a rotary pneumatic actuator including a rack that is linearly driven by a pinion. This type of actuator provides precise control in moving belts 202. After conveying a tire to the testing station 12, the actuator must be reversed to return the belts to their beginning position to convey the next tire from the centering station to the testing station. An actuator that may be used to drive the belts 202, for example, is a Parkhann 350 deg. rotary pneumatic actuator (model PTR 252-350-

4-FPAB21M). Precise control of the belt drive is desirable so that tires are properly positioned at the rotational axis of the testing station and/or the exit station 14. An encoder (not shown) preferably is provided to detect belt travel and permit movement of the inlet conveyor to be synchronized with movement of an exit conveyor.

The invention contemplates other types of drive components for the drive means 276. For example, the belts may also be precisely driven by an electric motor, under the control of a suitable control system that includes an encoder for monitoring the movement of the belts.

Figure 7:
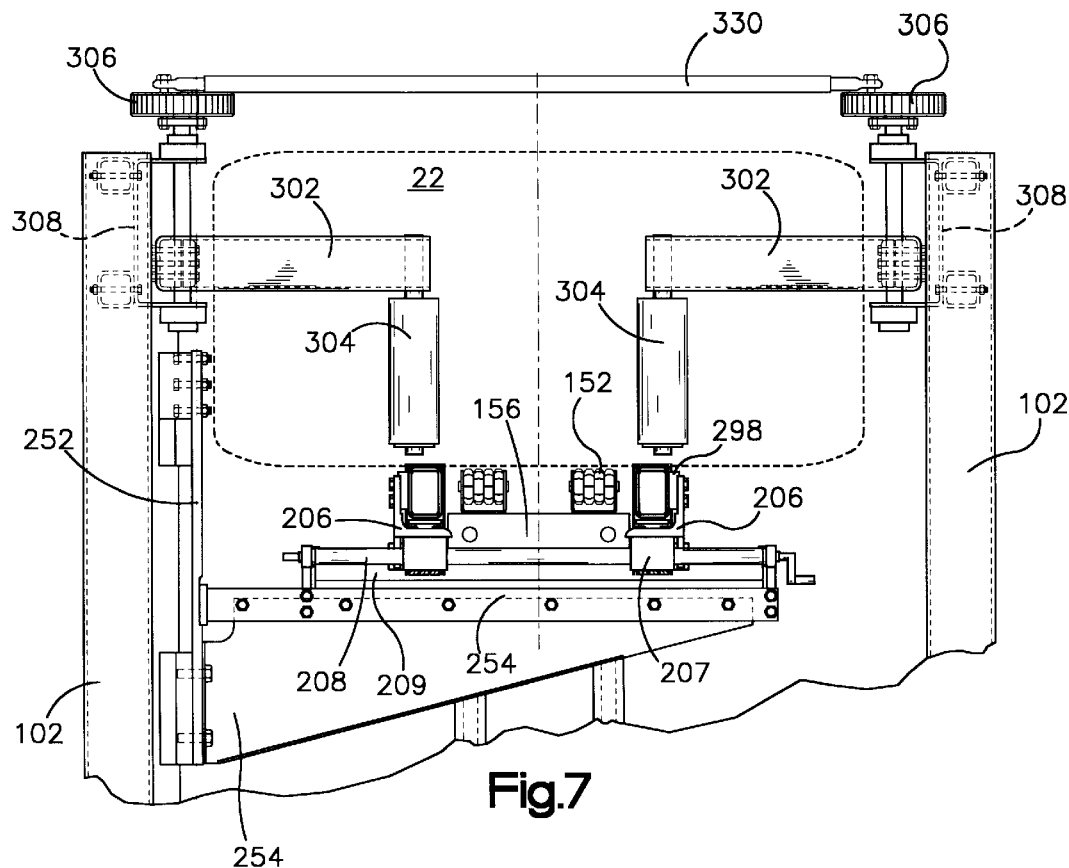
FIG. 7 is a fragmentary end elevation view of the centering station taken along lines 7—7 in FIG. 3.
Figure 8:
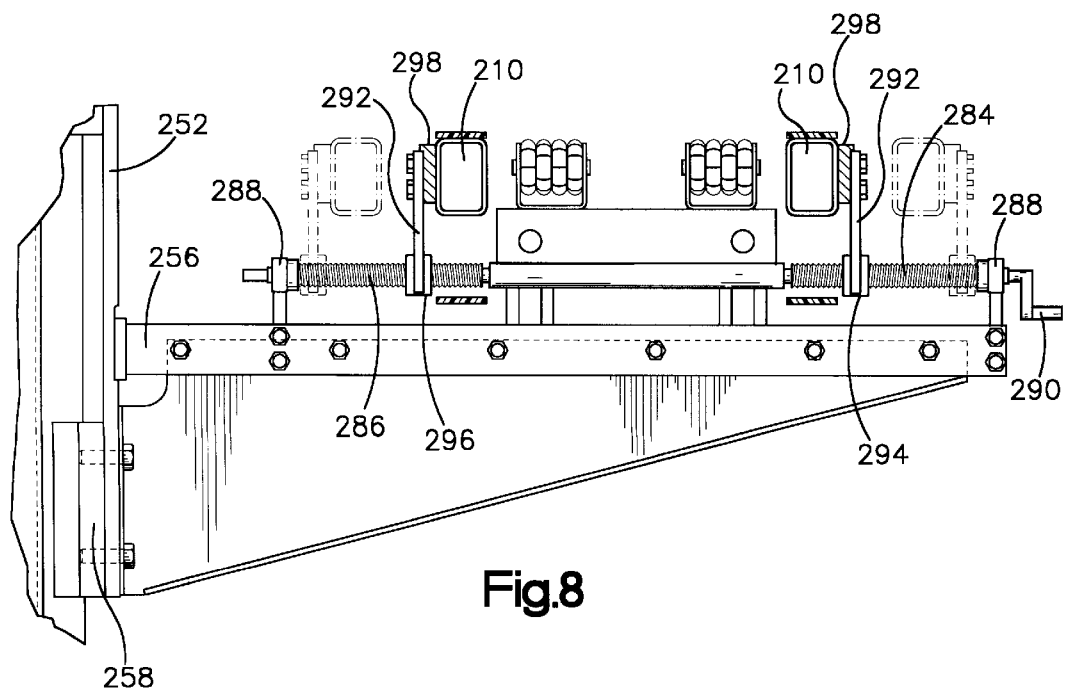
FIG. 8 is a fragmentary end elevation view of the centering station taken along lines 8—8 in FIG. 3.
Figure 10:
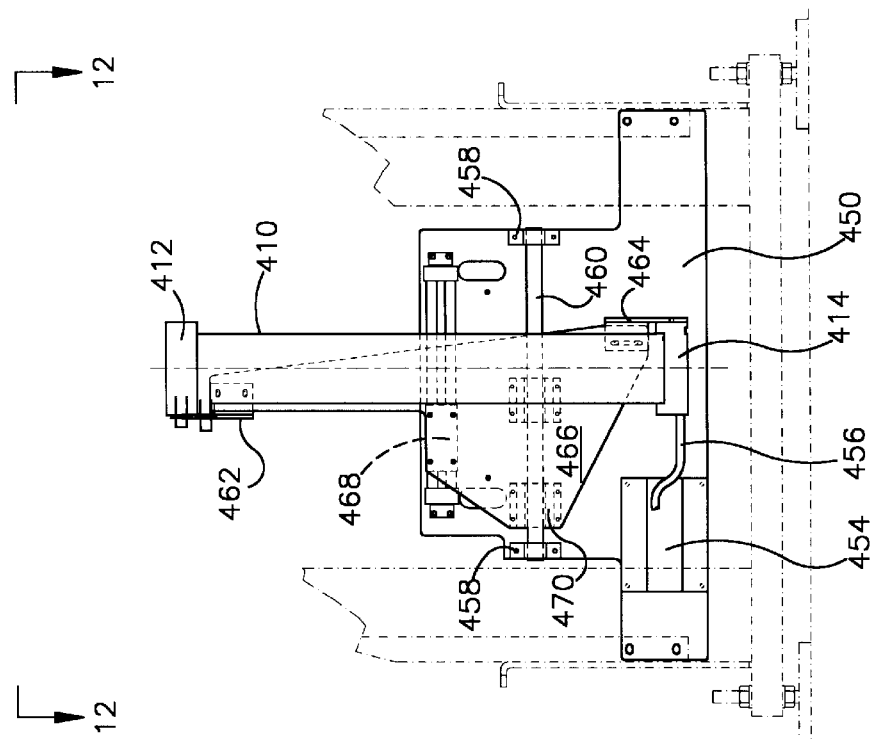
FIG. 10 is a fragmentary front elevation view of the tire lubrication device taken along lines 10—10 in FIG. 9.
Figure 9:
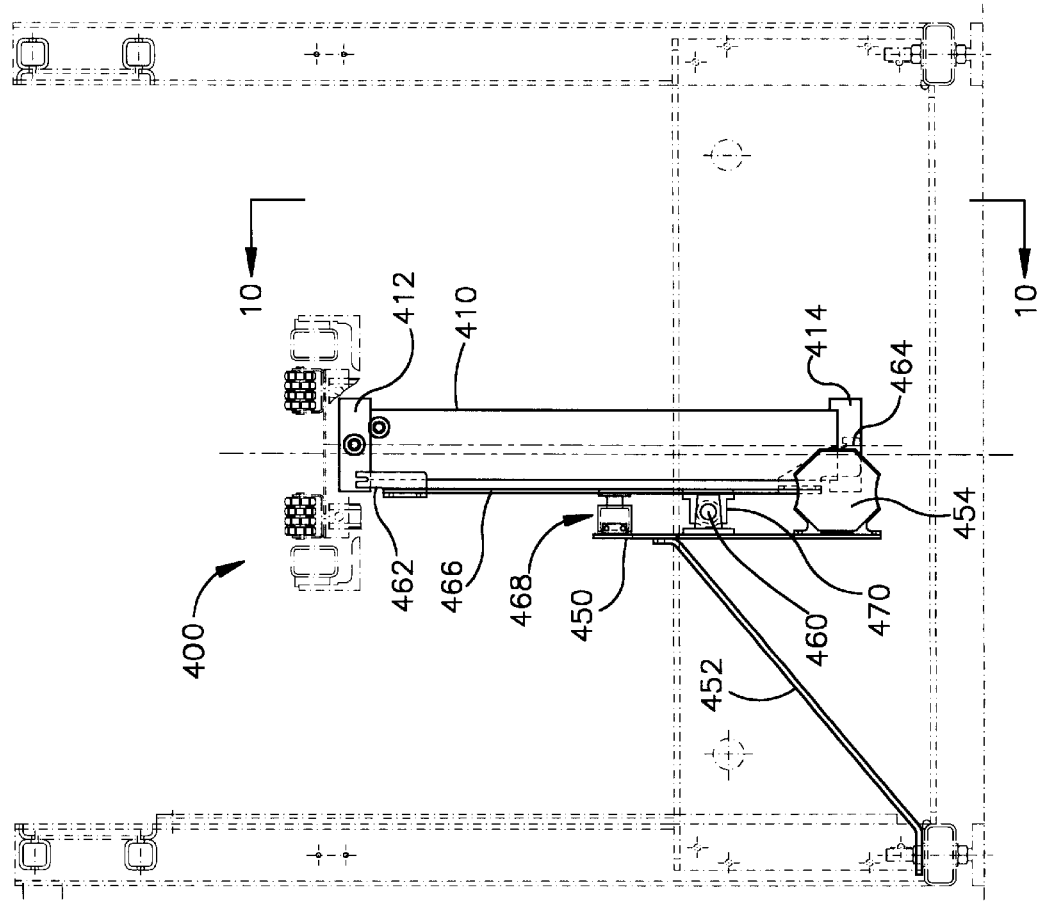
FIG. 9 is a fragmentary end elevation view of a tire lubrication device forming part of the tire testing system of FIG. 1.

The tire conveyor 200 is provided with a mechanism, indicated generally by the reference character 280 and shown best in FIGS. 3, 7 and 8, for adjusting the lateral position of conveyor belts 202 in order to support tires having different diameters. The conveyor support rails 210, inward of their ends that are secured to conveyor brackets 218 mounted on the drive shaft 240, are mounted to a support rail shaft 208. Support rail shaft 208 is fixed to a support member 209 that is attached to the forward elevator fork 254 (i.e., the fork located to the left in FIG. 3). The attachment of the shaft 208 to member 209, as well as member 209 to fork 254, may be achieved by any suitable means, e.g. welding, threaded fasteners, etc. The support rails 210 are provided with mounting pads 298 secured to the vertical legs of L-shaped width adjustment brackets 206 (FIG. 7). The horizontal legs of the brackets 206 are fixed to the upper portion of linear bearing members 207 slidably secured to rail support shaft 208. Thus, sliding bearing members 207 toward or away from each other moves rails 210 toward or away from each other thereby adjusting the width between conveyor belts 202.

With reference to FIGS. 3 and 8, the width adjustment mechanism 280 includes a screw 282 to facilitate adjustment of the lateral position of the rails 210. The screw 282 preferably is formed with a central unthreaded section disposed between two oppositely threaded sections 284, 286. The screw 282 is fixed at its opposite ends to the elevator fork 254 by support members 288 which, for example, are welded or fastened to the fork. The support members 288 are secured to the screw 282 so as to permit rotation of the screw upon actuation of suitable means for turning the screw, such as crank 290. The screw may be provided with nuts or other locking members that engage supports 288 to laterally fix the screw relative thereto. The support rails 210 are mounted to the screw 282 such that rotation of the screw moves the rails 210 toward or away from each other.

In particular, in the preferred embodiment, the rail mounting pads 298 have fixed thereto a pair of yoke members 292. The yoke members 292 are attached to (or formed integrally with) threaded nut portions 294, 296 engaged with adjustment screw 282 (FIG. 8). Specifically, the yoke disposed adjacent the elevator side of the machine has a right-hand threaded nut portion 296 engaging right-hand threaded screw section 286, while the yoke disposed adjacent the operator side of the machine has a left-hand threaded nut portion 294 engaging left-hand threaded screw section 284. As such, upon rotation of adjustment screw 282 the yokes 292 move toward or away from each other with the rails 210 secured thereto also moving toward or away from each other. Such movement of the rails 210 moves the brackets 206 and bearing members 207 along support shaft 208 and drive pulleys 230 along drive shaft 240, the drive pulleys sliding along the shaft but rotating therewith by virtue of the spline or key formed on the shaft. Thus, conveyor support rails 210 are supported by both drive shaft 240 and support shaft 208 during use and when adjusting the conveyor belt width. The drive shaft 240 preferably is provided with inner and outer pairs of bellows which cover the shaft in the various positions of the support rails. It should be appreciated that alternative structure may be used to facilitate lateral adjustment of the conveyor belt rails. For example, the screw 282 could be omitted with the bearing members 207 slidable along shaft 208 (either in unison or separately) with a set screw or other mechanism locking them in place.

Figure 4:
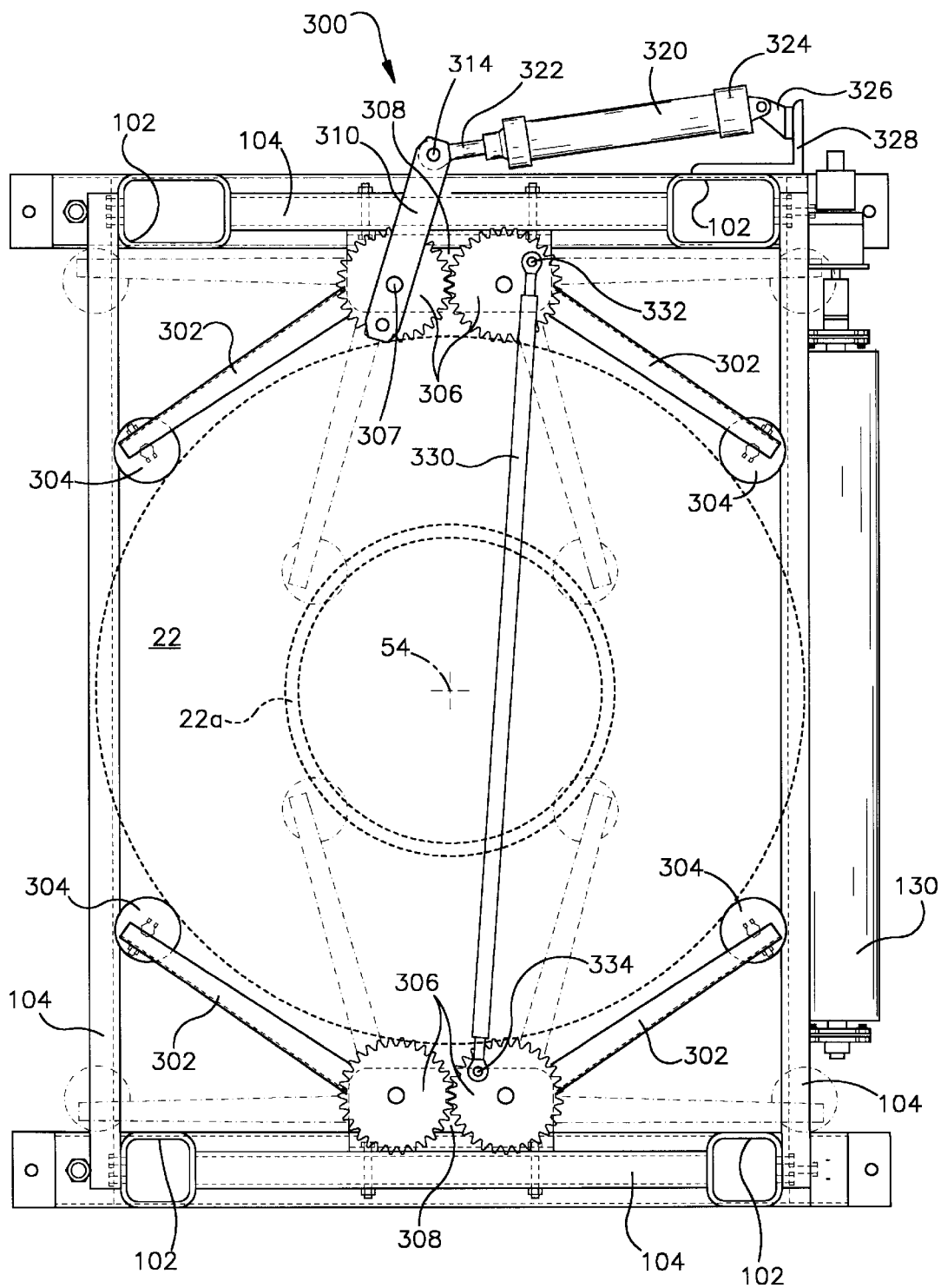
FIG. 4 is a plan view of a centering mechanism forming part of the centering station of FIG. 3.

The preferred embodiment of the invention also includes the centering mechanism 300 as best seen in FIGS. 4 and 5. The centering mechanism centers a tire at the centering station upon its delivery by the kick roller 130, and includes two pairs of pivoting arms 302 mounted to the frame 100 on either side of the centering axis 54. One end of each arm 302 mounts a vertically oriented, rotatable roller 304, while the other end is connected to a shaft 307 pivotally mounted to a bracket 308 fixed to one or more upper horizontal beams 104 by fasteners or other means. Preferably there are four arms 302 and four rollers 304 that form part of the centering mechanism 300. Rotation of shafts 307 pivots arms 302 toward or away from centering axis 54 so as to engage the outer periphery of a tire. FIG. 4 depicts two positions of the centering mechanism in which the arms 302 engage a tire 22 and a tire 22a.

The centering arms 302 are rotated by intermeshing pairs of gears 306 fixed to the upper ends of pivot shafts 307. As seen in FIG. 4, in a preferred embodiment, the pair of gears 306 located at the elevator side of the machine is driven by a pneumatic cylinder 320 including a cylinder rod 322. The butt end 324 of cylinder 320 is mounted to a hinge bracket 326 fixed to a channel-like member 328 attached to the frame unit 100. Cylinder rod 322 is connected at 314 to one end of a lever 310 which is connected near its opposite end to the pivot shaft 307 of one the gears 306. Accordingly, extending and retracting rod 322 rotates the gear 306, pivot shaft 307, and arm 302 either clockwise or counterclockwise. The gear connected to lever 310 is intermeshed with a mating gear such that the gears rotate together (in opposite directions) upon actuation of cylinder 320, thereby moving one pair of arms 302 toward or away from centering axis 54. As seen in FIGS. 4 and 5, an interconnecting link 330 extends across the frame structure and has one end 332 connected to one gear pair and another end 334 connected to the other gear pair. Thus, actuation of cylinder 320 rotates both gear pairs via interconnecting link 330 to move all four arms 302 and rollers 304 in unison toward or away from centering axis 54.

Figure 11:
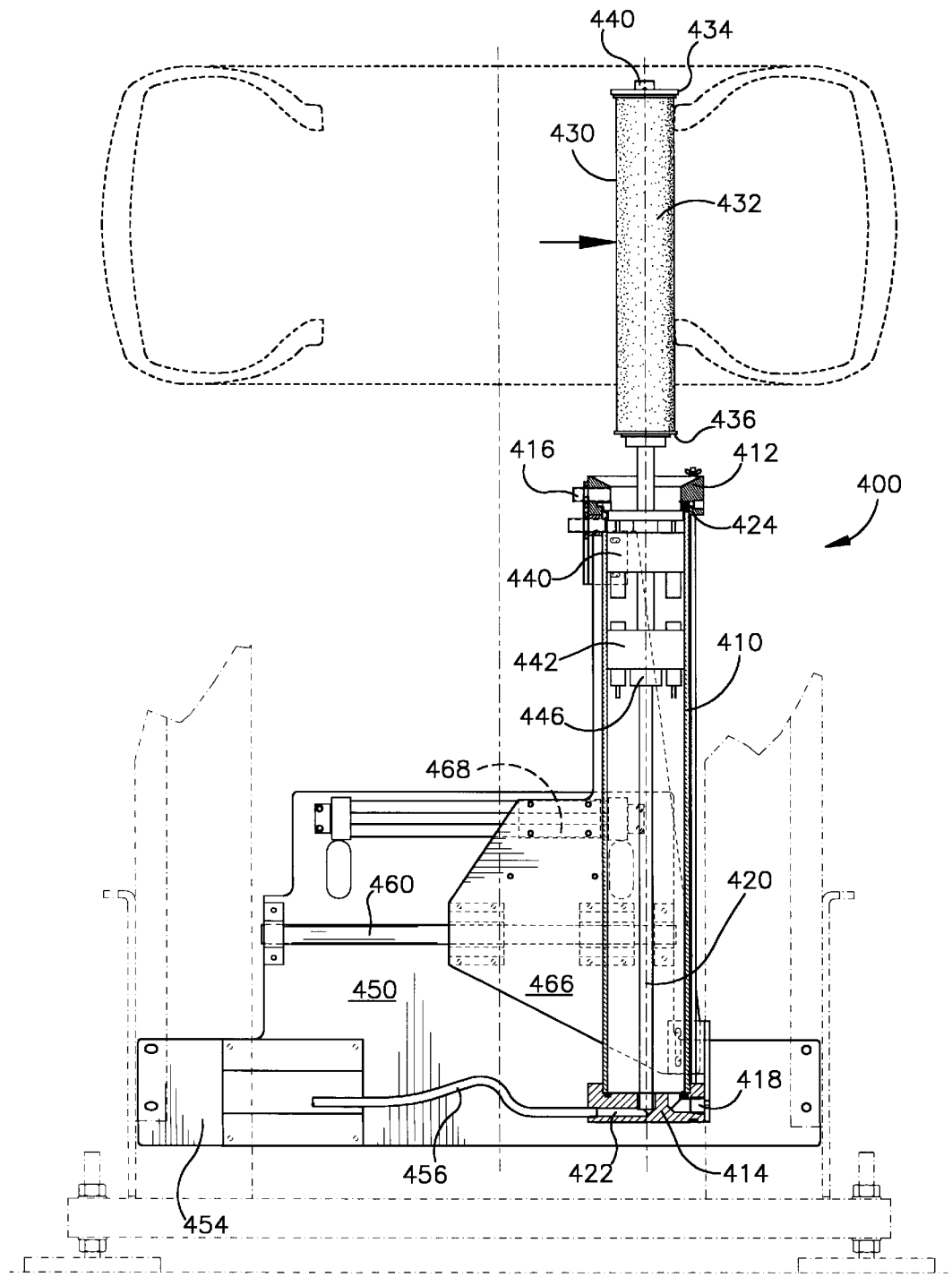
FIG. 11 is a fragmentary front elevation view of the tire lubrication device of FIG. 9 showing the device lubricating a tire.
Figure 12:
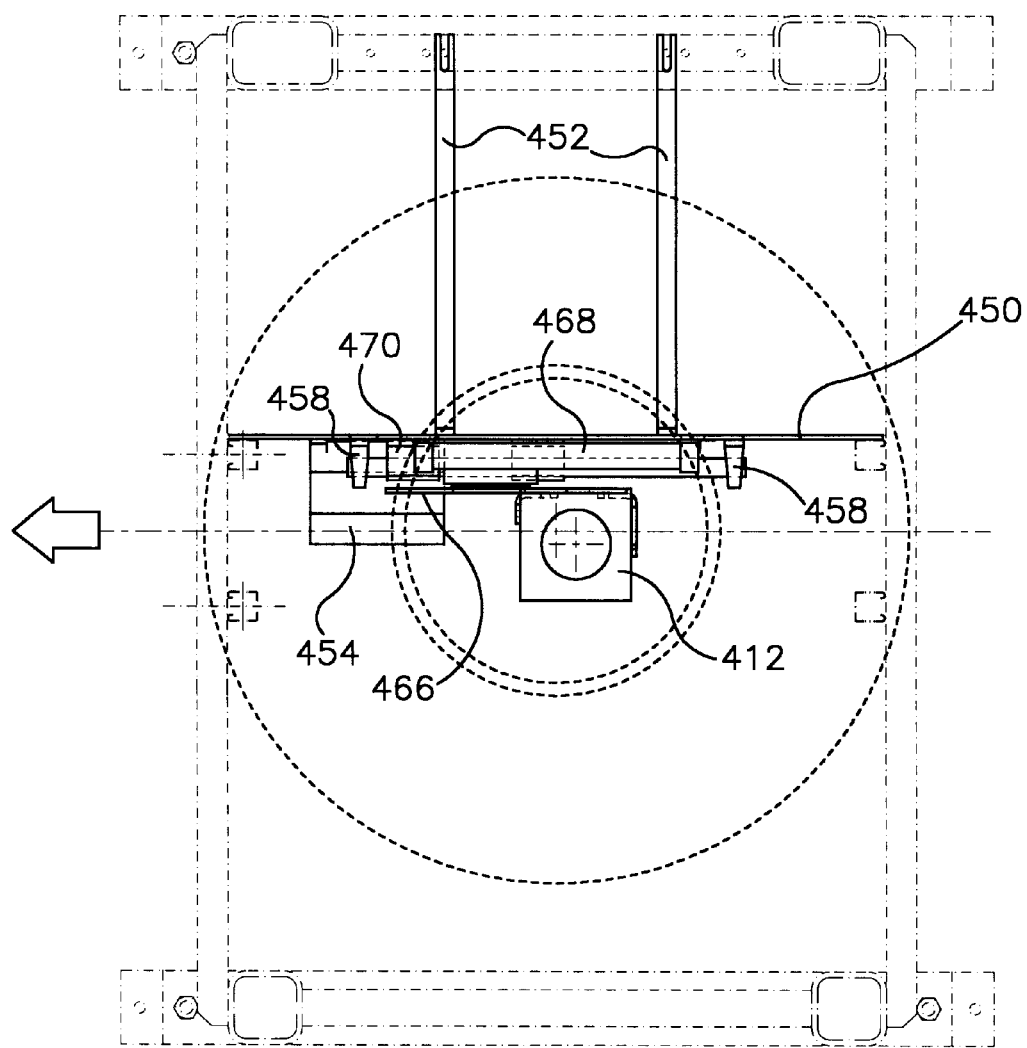
FIG. 12 is a plan view of the tire lubrication device of FIG. 9.

According to the preferred embodiment of the invention, the centering station is provided with means for applying a suitable lubricant to the upper and lower bead areas of the tire in order to enhance sealing and removal of the tire at the testing station. The preferred lubricant applying means is in the form of a lubricating mechanism indicated generally by reference numeral 400 in FIGS. 9–12. The a mechanism 400 includes a lubricant containment cylinder 410 that houses a vertically movable applicator roll 430 having a surface 432 adapted to attract lubricant, e.g. a flocked surface, and apply the lubricant to the upper and lower beads of a tire. The cylinder 410 has an upper cap 412 and a lower cap 414. The cap 412 includes a lubricant inlet 416 (FIG. 11) that receives lubricant from a tank or other supply (not shown), while the cap 414 includes an outlet 418 via which the lubricant drains back to the tank, the inlet and outlet being connected to the tank by suitable hoses or conduits (not shown). The cylinder has an apertured spray ring 424 through which the lubricant passes into the cylinder in order to evenly coat the applicator roll 430. The cylinder 410 preferably is made of plastic and is provided with a tension rod 448 extending along the exterior of the cylinder to reinforce the cylinder, for example, during lateral movement of the cylinder relative to the centering station to engage the bead areas of a tire.

The applicator roll 430 is closed at its upper end by a cap 434 and at its lower end by a cap 436. A hollow piston rod 440 passes through the spray ring 424 and has a closed end that extends through the upper cap 434 of the roll 430. The piston rod 440 is mounted to a pair of pistons 442, 444 via a nut 446, the pistons being slidably disposed in the cylinder 410. A pressure tube 420 is disposed within the cylinder 410 and communicates with an air inlet 422 that receives pressurized air from any suitable source, e.g., a pneumatic diaphragm pump 454 connected thereto by a conduit 456. The air passes through tube 420 into the interior of the piston rod 440 to raise the piston rod and applicator roll 430 out of the cylinder to the position shown in FIG. 11. The pistons guide the piston rod during movement into or out of the cylinder 410. Thus, the applicator roll 430 is received in the lubricant contained in cylinder 410 when in the retracted position such that the roll is coated with lubricant when later raised to its in use position projecting into the centering station.

The cylinder 410 and applicator roll 430 are mounted to the frame 100 by a base plate 450 (FIGS. 10 and 12) and a pair of braces 452. A carriage plate 466 is mounted to the cylinder 410 by upper and lower saddle members 462, 466 for facilitating moving the cylinder and applicator roll into engagement with a tire. A pair of blocks 458 are fixed to the base plate 450 and mount a bearing shaft 460. The carriage plate 466 is provided with bearings 470 slidably engaged with the shaft 460. The carriage plate 466 is driven along the bearing shaft by any suitable means. A preferred means is a pneumatic actuator, indicated schematically by reference numeral 468, which may be, for example, a Parkhann rodless air cylinder (model 25CFMRCTUCX7.5) mounted to the base plate 450.

Accordingly, in order to lubricate the bead areas of a tire located at the centering station, the pump 454 is activated to pressurize the piston rod and raise the applicator roll 430 out of the cylinder into the central opening of the tire. The actuator 468 then is actuated to move the applicator roll 430 into the bead areas, for example, to the right as indicated by the arrow in FIG. 11. While this movement is in an opposite direction to the flow of tires through the system (which flow is indicated by the arrow in FIG. 12), alternate methods of engaging the roll 430 with the tire may be used. The tire is rotated at the centering station such that the entire bead areas are lubricated by the roll 430. A preferred means of rotating the tire comprises driving one of the centering rollers 304 by a motor, although other means may be used to rotate the tire.

The inlet conveyor operates as follows. Prior to receiving a tire at the centering station, the inlet conveyor 200 and elevator 250 are lowered by the actuator 110 to the position shown in FIG. 6. A tire 22 then is driven onto the fixed conveyor 150 by the kick roller 130. Once a tire is positioned at the centering station, centering mechanism 300 is actuated to move centering arms 302 toward the tire until the rollers 304 center the tire. One of the centering rollers 304 is actuated to rotate the tire and the lubricant applicator is operated to raise the applicator roll. The applicator roll then is moved laterally into the rotating tire and the lubricant is applied to the upper and lower beads of the tire. The applicator roll then is lowered and rotation of the centering roller is stopped. The centered and lubricated tire is ready to be conveyed to the testing station. The elevator 250 and inlet conveyor 200 are raised by actuator 110 until the conveyor belts 202 pick up the tire and, in effect, raise it above the fixed conveyor 150, this position of the conveyor being shown in solid lines in FIG. 6. Each roller 304 is mounted such that it can be moved vertically a predetermined distance in order to accommodate relative movement between the tire and the centering arms 302 as the conveyor engages and lifts the tire. The centering arms 302 then are moved outwardly to their retracted positions.

The tire to be tested, now supported by the conveyor 200, has been centered with respect to centering axis 54 and is located a predetermined distance from the rotational axis 56 of the spindle assembly 30. The conveyor actuator 276 then is actuated to advance the tire the predetermined distance toward the testing station 12 until the tire is disposed above and is coincident with the rotational axis 56 of the spindle assembly 30, this position being indicated by tire 20 shown in phantom in FIG. 2. The actuator 110 then is energized to lower the conveyor 200 and position the tire 20 onto the spindle assembly 30. FIG. 6 shows the conveyor 200 in its lowered position with tire 20 located on spindle assembly 30 (and clamped between the rims carried by spindle and chuck assemblies 30, 32). Normally, conveyor actuator 276 then would be reverse actuated to return the belts 202 to their starting position. While the conveyor 200 is in its lowered position, another tire "IT" may be brought into the centering station by kick roller 130 and subsequently centered while a tire is being tested at the testing station 12. Conveyor 200 then is raised to the position of FIG. 2 to pick up tire 22 (which has been centered) off of conveyor 150 and tire 20 (which has been tested) off of spindle assembly 30. Subsequent movement of the conveyor belts transports tire 22 to the testing station and tire 20 to an exit conveyor, as shown in FIG. 1.

One benefit of the preferred embodiment of the inlet conveyor is that there is no direct mechanical coupling between the inlet conveyor and the testing station of the machine, i.e., neither the centering station nor the tire conveyor is mechanically coupled to the testing station. Only electrical and data connections are made between the inlet conveyor and testing station. The elimination of a mechanical connection between the inlet conveyor and testing station ensures that disturbances affecting the centering station and/or the conveyor, for example, vibrations, shocks, etc., are not transmitted to the testing station. Thus, unlike systems in which the inlet conveyor forms part of or is connected to the testing machine, in the invention such disturbances will not result in erroneous or inconsistent uniformity readings or determinations.

Additionally, the inlet conveyor of the invention may easily be relocated relative to the remaining components of the testing machine to permit reversal of the direction of tire flow. For example, referring to FIG. 1, the inlet conveyor 10 may be moved to the left end of the machine while the exit assembly 14 is moved to the right end. Consequently, should the need arise, the inlet conveyor of the invention permits reversing the direction of tire flow though an existing machine in a relatively quick and easy manner. This aspect of the invention provides additional flexibility in that a user can select an optimum tire flow direction when initially installing a tire testing machine. Prior art inlet conveyors used with tire testing systems did not provide such flexibility. While it is preferred to mechanically isolate the inlet conveyor of the invention from the testing station for the reasons discussed above, those skilled in the art will of course recognize that the conveyor disclosed herein could be mechanically coupled to the testing station should it be desirable for a given application.

Although the invention has been described with a certain degree of particularity, it should be understood that those skilled in the art can make various changes and modifications without departing from the spirit or scope of the invention as hereinafter claimed.

What is claimed is:

1. A tire testing system comprising:
   a tire centering station for receiving and centering a tire to be tested, the centering station including a support defining a centering axis about which a tire is centered;
   a tire testing station for receiving tires that have been centered at the centering station, the tire testing station defining a testing axis about which a tire is rotated when being tested, wherein the testing axis is spaced a predetermined distance from the centering axis;
   a conveyor including at least one conveying member defining a tire support surface engageable with a tire and being rectilinearly movable a distance corresponding to said predetermined distance in order to effect movement in a tire from the centering station to the testing station; and
   conveyor drive means for rectilinearly advancing the conveying member said corresponding distance such that upon termination of movement of said conveying member, a tire engaged by said tire support surface is substantially aligned with said testing axis to carry a tire from the centering station to the testing station.

2. A tire testing system according to claim 1, wherein said tire support surface is formed by at least one endless belt.

3. A tire testing system according to claim 2, wherein said tire support surface is formed by two endless belts each received around a pair of pulleys, each pair of pulleys including a pulley mounted adjacent to the centering station and a pulley mounted adjacent to the testing station.

4. A tire testing system according to claim 1, wherein the conveyor drive means alternately advances and retracts the conveying member between fixed stops provided adjacent the conveying member.

5. A tire testing system according to claim 1, wherein the conveying member is supported by a support rail, and further comprising means for securing the support rail to the centering station so as to permit the support rail and the conveying member to be pivoted away from the testing station.

6. A tire testing system according to claim 1, wherein the centering station comprises a tire lubricator for applying lubricant to the bead area of a tire, means for engaging the tread of a tire to rotate the tire at the centering station, and an applicator for applying lubricant to the bead area of the tire.

7. A tire testing system according to claim 1, wherein the centering station comprises a tire lubricator for applying lubricant to the bead area of a tire, means for rotating the tire at the centering station, and an applicator for applying lubricant to the bead area of the tire, further comprising a support surface for supporting a tire at the centering station, the support surface including a plurality of rollers free to rotate about a longitudinal axis and a plurality of subrollers free to rotate about a transverse axis.

8. A tire testing system according to claim 1, wherein the centering station comprises a tire lubricator for applying lubricant to the bead area of a tire, means for rotating the tire at the centering station, and an applicator for applying lubricant to the bead area of the tire, further comprising an actuator for raising the applicator to lubricate a tire and lowering the applicator to allow the tire to be conveyed from the centering station to the testing station, wherein the actuator comprises a pneumatic cylinder with a wall that forms a reservoir for the lubricant.

9. A tire testing system according to claim 1, wherein the centering station comprises a tire lubricator for applying lubricant to the bead area of a tire, means for rotating the tire at the centering station, and an applicator for applying lubricant to the bead area of the tire, the centering station further comprising a plurality of centering arms movable toward or away from the centering axis, and wherein the means for rotating the tire at the centering station is mounted to at least one of said plurality of centering arms.

10. A tire testing system according to claim 1, further comprising an actuator for moving the at least one conveying member between raised and lowered positions with respect to the centering and testing stations.

11. A tire testing system according to claim 10, wherein the centering station includes a frame to which the conveyor is movably secured, and the actuator is mounted to the frame and engages a conveyor elevator, said conveyor elevator operative to move the conveying member between said raised and lowered positions.

12. A tire testing system according to claim 11, wherein the elevator has at least one guide engaging a corresponding guide portion on the frame to permit sliding movement of the elevator with respect to the frame, and the actuator comprises a pneumatic cylinder.

13. A tire testing system according to claim 12, wherein the conveyor includes two rails respectively supporting two conveying members, wherein the first ends of the rails are fixed to the elevator and the second ends of the rails extend away from the elevator in a cantilever manner.

14. A tire testing system according to claim 13, wherein the position of the two rails is adjustable to change the size of the space between said conveying members.

15. A tire testing system according to claim 1, wherein the centering station includes a support surface that permits tires to be moved in multiple directions while being centered, said support surface being separate from and disposed adjacent to said conveyor.

16. A tire transport apparatus for transporting tires to a tire testing machine, the tire transport apparatus configured to be located adjacent to but free of mechanical connections to a tire testing machine, the transport apparatus comprising:
   a self-supporting frame including a base for contacting a support surface;
   a conveyor secured to the frame to convey tires in a conveying direction relative to the frame; and
   an actuator secured to the frame for driving the conveyor to move the conveying surface in said conveying direction;
   wherein the conveyor has a first portion secured to the frame for receiving tires to be tested, and a second portion supported by the first portion in a cantilever manner and extending away from the frame to convey tires away from the frame in said conveying direction.

17. A tire testing system comprising:
   a tire receiving station;
   a tire testing station located downstream of the receiving station, the testing station including means for rotating and testing the uniformity of a tire; and
   a conveyor for transporting a tire from the receiving station to the testing station;
   wherein said conveyor forms part of a separate, self-supporting structure that is mechanically unattached to the testing station, the tire testing system being substantially free of mechanical connections between the receiving and testing stations to substantially prevent disturbances occurring at the receiving station and on the conveyor from being transmitted to the testing station.

18. A tire testing system according to claim 17, wherein the receiving station comprises means for separating one tire from a supply of tires to be tested.

19. A tire testing system according to claim 17, wherein the receiving station comprises means for centering a tire.

20. A tire testing system according to claim 17, wherein the receiving station comprises means for lubricating the bead area of a tire.

21. A tire testing system according to claim 17, wherein the conveyor is mechanically attached and operatively connected to the receiving station.

22. A tire testing system according to claim 17, wherein the receiving station comprises a tire lubricator for applying lubricant to the bead area of a tire, the tire lubricator comprising means for engaging the tread of a tire to rotate the tire at the receiving station, and an applicator for applying lubricant to the bead area of the tire.

23. A tire testing system according to claim 17, wherein the receiving station comprises a tire lubricator for applying lubricant to the bead area of a tire, the tire lubricator comprising means for rotating the tire at the receiving station and means for applying lubricant to the bead area of the tire, further comprising a support surface for supporting a tire at the receiving station including a plurality of rollers free to rotate about a longitudinal axis that support a plurality of subrollers free to rotate about a transverse axis.

24. A tire testing system according to claim 17, wherein the receiving station comprises a tire lubricator for applying lubricant to the bead area of a tire, the tire lubricator comprising means for rotating the tire at the receiving station and an applicator for applying lubricant to the bead area of the tire, further comprising an actuator for raising the applicator to permit lubricating a tire and lowering the applicator to permit conveying the tire from the receiving station to the testing station, wherein the actuator comprises a pneumatic cylinder with a wall that forms a reservoir for the lubricant.

25. A tire testing system according to claim 17, wherein the receiving station comprises a tire lubricator for applying lubricant to the bead area of a tire, the tire lubricator comprising means for rotating the tire at the receiving station and an applicator for applying lubricant to the bead area of the tire, the receiving station further comprising a plurality of pivoted centering arms movable toward or away from a centering axis, and wherein the means for rotating the tire at the receiving station is mounted to at least one of said plurality of centering arms.

26. A process for transporting tires to a tire testing machine, the process comprising steps of:
a) feeding a tire onto a support;
b) raising a conveyor into engagement with the tire to lift the tire above the support;
c) actuating the conveyor to convey the tire to a testing station disposed downstream from the support; and
d) disengaging the conveyor from the tire to position the tire at the testing station.

27. A process according to claim 26, wherein the support is located at a centering station and further comprising the step of centering the tire at said centering station before raising the conveyor.

28. A tire testing system comprising:
a tire centering station for receiving and centering a tire to be tested, the centering station including a support defining a centering axis about which a tire is centered;
a tire testing station for receiving tires that have been centered at the centering station, the tire testing station defining a testing axis about which a tire is rotated when being tested, wherein the testing axis is spaced a predetermined distance from the centering axis;
a conveyor including at least one conveying member movable to convey a tire from the centering station to the testing station;
means for advancing the conveying member a distance corresponding to said predetermined distance to carry a tire from the centering station to the testing station;
said centering station including a tire lubricator for applying lubricant to the bead area of a tire, means for engaging the tread of a tire to rotate the tire at the centering station, and an applicator for applying lubricant to the bead area of the tire.

29. A tire testing system comprising:
a tire centering station for receiving and centering a tire to be tested, the centering station including a support defining a centering axis about which a tire is centered;
a tire testing station for receiving tires that have been centered at the centering station, the tire testing station defining a testing axis about which a tire is rotated when being tested, wherein the testing axis is spaced a predetermined distance from the centering axis;
a conveyor including at least one conveying member movable to convey a tire from the centering station to the testing station;
means for advancing the conveying member a distance corresponding to said predetermined distance to carry a tire from the centering station to the testing station;
said centering station including:
i) a tire lubricator for applying lubricant to the bead area of a tire, means for rotating the tire at the centering station, and an applicator for applying lubricant to the bead area of the tire; and,
ii) a plurality of centering arms movable toward or away from the centering axis wherein the means for rotating the tire at the centering station is mounted to at least one of said plurality of centering arms.

30. A tire testing system comprising:
a tire centering station for receiving and centering a tire to be tested, the centering station including a support defining a centering axis about which a tire is centered;
a tire testing station for receiving tires that have been centered at the centering station, the tire testing station defining a testing axis about which a tire is rotated when being tested, wherein the testing axis is spaced a predetermined distance from the centering axis;
a conveyor including at least one conveying member movable to convey a tire from the centering station to the testing station; and
means for advancing the conveying member a distance corresponding to said predetermined distance to carry a tire from the centering station to the testing station;
said centering station including a support surface that permits tires to be moved in multiple directions while being centered, said support surface being separate from and disposed adjacent to said conveyor.

31. A tire testing system according to claim 30, wherein the support surface is fixed in position with respect to the centering station and a plurality of movable centering arms are disposed adjacent to the support surface for centering a tire resting on the support surface.

* * * * *